(12) United States Patent
Ording et al.

(10) Patent No.: US 7,956,846 B2
(45) Date of Patent: Jun. 7, 2011

(54) PORTABLE ELECTRONIC DEVICE WITH CONTENT-DEPENDENT TOUCH SENSITIVITY

(75) Inventors: Bas Ording, San Francisco, CA (US); Scott Forstall, Mountain View, CA (US); Greg Christie, San Jose, CA (US); Stephen O. Lemay, San Francisco, CA (US); Imran Chaudhri, San Francisco, CA (US); Scott Herz, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 699 days.

(21) Appl. No.: 11/620,027

(22) Filed: Jan. 4, 2007

(65) Prior Publication Data
US 2008/0216001 A1    Sep. 4, 2008

Related U.S. Application Data

(60) Provisional application No. 60/756,833, filed on Jan. 5, 2006.

(51) Int. Cl.
*G06F 3/041* (2006.01)
(52) U.S. Cl. .................... 345/173; 715/763
(58) Field of Classification Search .......... 345/173–178; 178/18.01–18.09; 704/1–10; 715/763
See application file for complete search history.

(56) References Cited

U.S. PATENT DOCUMENTS

| | | | | |
|---|---|---|---|---|
| 6,025,726 | A | * | 2/2000 | Gershenfeld et al. ......... 324/671 |
| 7,085,693 | B2 | * | 8/2006 | Zimmerman ..................... 703/6 |
| 7,236,159 | B1 | * | 6/2007 | Siversson ..................... 345/173 |
| 7,475,015 | B2 | * | 1/2009 | Epstein et al. ................. 704/257 |
| 2002/0190964 | A1 | * | 12/2002 | Van Berkel ................... 345/173 |
| 2004/0024710 | A1 | * | 2/2004 | Fernando et al. ............... 705/50 |
| 2004/0196266 | A1 | * | 10/2004 | Matsuura et al. ............. 345/169 |
| 2005/0078027 | A1 | * | 4/2005 | Philipp ......................... 341/173 |
| 2005/0167588 | A1 | * | 8/2005 | Donnangelo ................. 250/307 |
| 2006/0066591 | A1 | * | 3/2006 | Marggraff et al. ........... 345/179 |
| 2006/0139032 | A1 | * | 6/2006 | Kalokitis et al. ............. 324/457 |

OTHER PUBLICATIONS

Centroid, http://faculty.evansville.edu/ck6/tcenters/class/centroid.html, printed Apr. 28, 2006, 4 pages.
Electric Potential, http://en.wikipedia.org/wiki/Electrical_potential, printed Dec. 28, 2007, 5 pages.
Electrostatic Potential, Scalar Potential versus Vector Field, http://www.phy.duke.edu/~rgb/Class/phy42/node10.html, printed Apr. 19, 2006, 6 pages.

* cited by examiner

*Primary Examiner* — Richard Hjerpe
*Assistant Examiner* — Sahlu Okebato
(74) *Attorney, Agent, or Firm* — Morgan, Lewis & Bockius LLP

(57) ABSTRACT

A portable electronic device, having a touch-sensitive display, displays a plurality of icons on the touch-sensitive display. A contact region when a user makes contact with the touch-sensitive display is detected. Whether the contact region corresponds to one of the plurality of icons is determined in accordance with an electrostatic model.

24 Claims, 11 Drawing Sheets

PORTABLE ELECTRONIC DEVICE WITH CONTENT-DEPENDENT TOUCH SENSITIVITY

CROSS REFERENCE TO RELATED APPLICATIONS

This application claims priority of U.S. Provisional Patent Application No. 60/756,833, filed Jan. 5, 2006, entitled "Portable Electronic Device with Content-Dependent Touch Sensitivity," which application is incorporated by reference herein in its entirety.

TECHNICAL FIELD

The disclosed embodiments relate to user interfaces, and in particular, to user interfaces that employ touch-sensitive displays and include content-dependent touch sensitivity.

BACKGROUND

As portable devices become more compact, and the amount of information to be processed and stored increases, it has become a significant challenge to design a user interface that allows users to easily interact with the device. This is unfortunate since the user interface is the gateway through which users receive not only content but also responses to user actions or behaviors, including user attempts to access a device's features or tools. Some portable electronic devices (e.g., mobile phones) have resorted to adding more pushbuttons, increasing a density of push buttons, overloading the functions of pushbuttons, or using complex menu systems to allow a user to access, store and manipulate data. These conventional user interfaces often result in complicated key sequences and menu hierarchies that must be memorized by the user. In addition, as the number of pushbuttons has increased the proximity of neighboring buttons often makes it difficult for users to activate a desired pushbutton.

Many conventional user interfaces, such as those that include physical pushbuttons, are also inflexible. This is unfortunate since it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

Accordingly, there is a need for more transparent and intuitive user interfaces for portable electronic devices that are easy to use, configure, and/or adapt.

SUMMARY OF EMBODIMENTS

The above deficiencies and other problems associated with user interfaces for portable devices are reduced or eliminated by the disclosed portable electronic device that includes a content-dependent user interface.

In some embodiments, a method includes displaying a plurality of icons on a touch-sensitive display; detecting a contact region when a user makes contact with the touch-sensitive display; and determining whether the contact region corresponds to one of the plurality of icons in accordance with an electrostatic model.

A respective icon in the plurality of icons may be assigned a respective charge Q, including a respective magnitude, in the electrostatic model. The respective charge Q may include a respective sign. The respective charge Q may be determined in accordance with a risk assessment for activation of the respective icon.

In some embodiments, the respective charge Q is modeled as a point charge. In some embodiments, the respective charge Q is modeled as a charge distributed over a respective area in the touch-sensitive display.

In some embodiments, the respective charge Q gives rise to a field having a field magnitude proportional to $Q/\Delta r^n$, where $\Delta r$ is a relative distance from the respective icon in a plane of the touch-sensitive display. n may be between approximately 1 and approximately 2. The field may be truncated at a respective boundary surface corresponding to the respective icon.

In some embodiments, the method further includes determining a total field at a contact position by linear superposition of fields corresponding to respective charges for one or more of the plurality of icons. In some embodiments, the method further includes determining whether a function corresponding to the respective icon is activated, at least in part, in accordance with a direction of the total field and/or when a user makes and breaks contact with the touch-sensitive display.

In some embodiments, a respective contact area for the respective icon is determined in accordance with a context for the function corresponding to the respective icon.

In some embodiments, the respective charge Q for the respective icon is determined in accordance with the context for the function corresponding to the respective icon. The determining may be in accordance with a data structure that corresponds to a language. The data structure may be based on a stochastic model of relationships among letters in the language, where the stochastic model includes relative frequencies of occurrence of groups of letters. The data structure may include lexicography and usage that is user-specific.

In some embodiments, a portable electronic device includes a multi-touch-sensitive display and one or more processors coupled to the multi-touch-sensitive display. The one or more processors may be configurable or configured to detect a contact region corresponding to at least one displayed icon in accordance with an electrostatic model.

The aforementioned methods may be performed by a portable electronic device having a touch-sensitive display with a graphical user interface (GUI), one or more processors, memory and one or more modules, programs or sets of instructions stored in the memory for performing these methods. In some embodiments, the portable electronic device provides a plurality of functions, including wireless communication.

Instructions for performing the aforementioned methods may be included in a computer program product configured for execution by one or more processors.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Embodiments of a method and their application to devices, such as portable electronic devices that include a touch-sensitive display are described. In the method, a contact region when a user makes contact with the touch-sensitive display is detected. Whether the contact region corresponds to at least one of a plurality of displayed icons is determined in accordance with an electrostatic model.

A respective icon in the plurality of icons may be assigned a respective charge Q, including a respective magnitude, in the electrostatic model. The respective charge Q may include a respective sign. A total field (and/or a total potential) at a contact position may be determined by linear superposition of fields (and/or potentials) corresponding to respective charges for one or more of the plurality of icons. Whether a function corresponding to the respective icon is activated may be determined, at least in part, in accordance with a direction of the total field and/or when a user makes and breaks contact with the touch-sensitive display.

The respective charge Q and/or respective contact area for the respective icon may be determined in accordance with the context for the function corresponding to the respective icon. For example, the respective charge Q may be determined in accordance with a risk assessment for activation of the respective icon. The respective charge Q may be determined in accordance with a data structure that corresponds to a language. For example, the data structure may be based on a stochastic model of relationships among letters in the language, including relative frequencies of occurrence of groups of letters. The data structure may include lexicography and usage that is user-specific.

Attention is directed towards embodiments of portable devices, including portable communications devices, that have user interfaces with context-dependent touch sensitivity.

Figure 1:
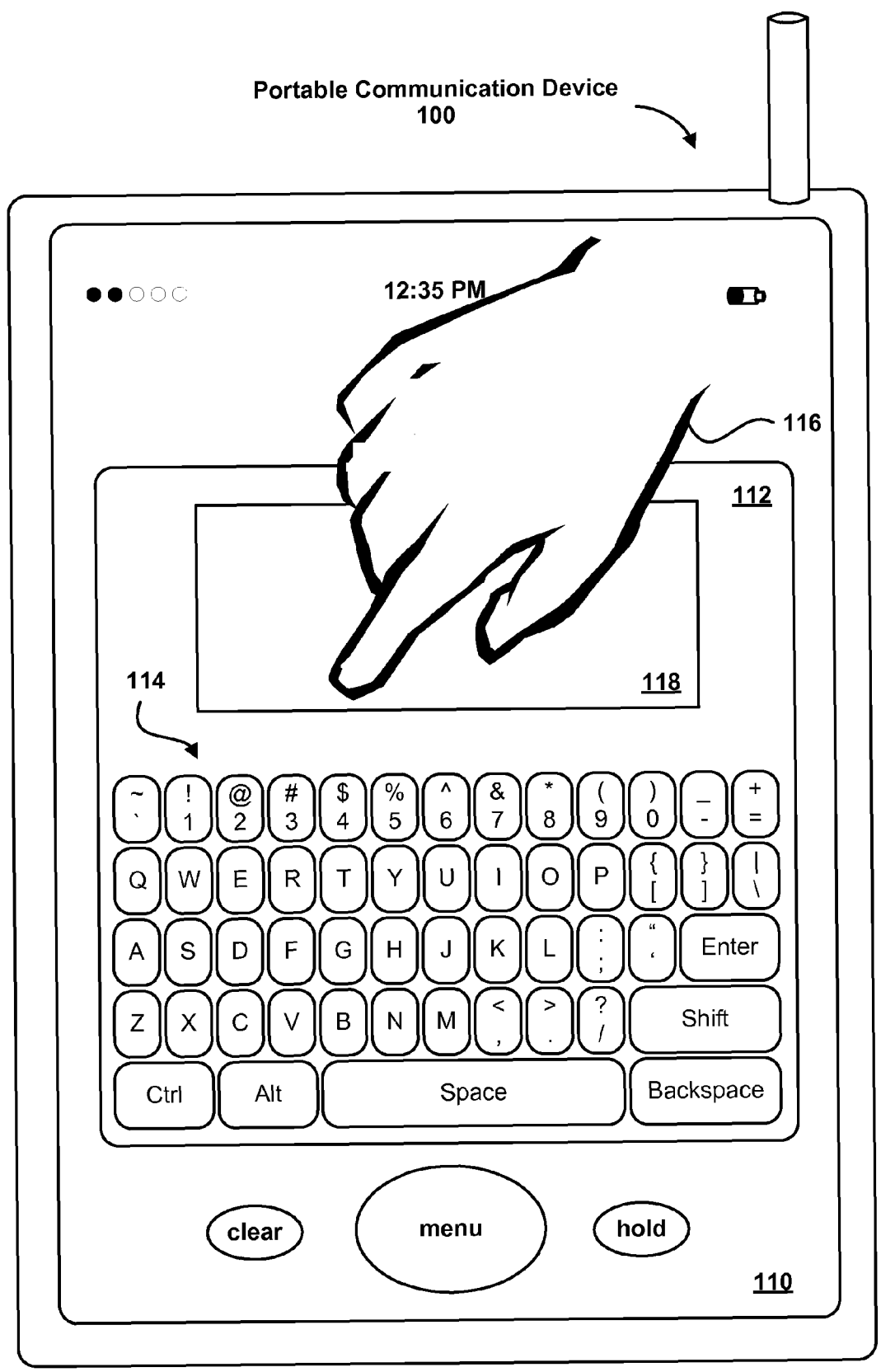
FIG. 1 is a schematic diagram illustrating an embodiment of a portable electronic device responsive to touch input.

FIG. 1 is a schematic diagram illustrating an embodiment of a portable electronic device 100 responsive to touch input. The portable electronic device 100 includes a touch-sensitive display surface 110 with a GUI. The display surface 110 may be a touch-sensitive display, which responds to physical contact by a stylus or one or more fingers at one or more contact positions. While the following embodiments may be equally applied to other types of displays, a touch-sensitive display is used as an illustrative example.

In some embodiments, the display surface 110 is transparent to allow various graphical objects or icons to be displayed to the user (e.g., widgets, which are combinations of states and procedures that constitute on-screen representations of controls that may be manipulated by the user, such as bars, buttons and text boxes). The GUI may include one or more sections or windows, such as region 112. The region 112 may include a plurality of icons or graphical objects that are displayed. At least a subset of the plurality of graphical objects may comprise a keyboard 114. In other embodiments, the graphical objects may correspond to another application (corresponding, for example, to a video, a weather forecast, a schedule, a game, music, mail, an address book, a browser, etc.) that is currently running on the portable electronic device 100. There may also be a region 118 where one or more characters on the keyboard 114 that are selected by a user are displayed.

The GUI may also include graphical objects corresponding to high-level functions of the portable electronic device 100. For example, various objects and/or images may be presented and changed in the GUI by pressing a menu button. In mobile phone embodiments, dedicated graphical objects can be presented in the GUI representing traditional voice and data service operations (e.g., hold, clear, etc.).

The user may interact with the portable communications device 100 by making contact with the display surface 110 using a stylus, a finger 116 (not drawn to scale in the figure) or more than one finger. For example, the respective user may make contact with the display surface 110 at a position of one of the graphical objects displayed on the keyboard 114 (direct contact) thereby activating the function corresponding to that graphical object. In some embodiments, the graphical object is activated when the user makes contact at the position of the graphical object and then breaks contact (for example, a tapping gesture). In some embodiments, the contact with the display surface 110 used to activate the graphical object may not be at the position of the graphical object. Instead, contact may be proximate to the graphical object (indirect contact) or even anywhere on the display surface 110 (where the nature of the contact, such as a sliding motion or a swipe across the display surface 110, can be related to a function of a particular graphical object). The latter technique is similar to "hot spots" used with Web pages and other computer user interfaces. As described further below with reference to FIGS. 2A and 2B, whether the user makes contact with the contact region corresponding to at least one of the displayed graphical objects may be determined in accordance with an electrostatic model. As discussed further below with reference to FIGS. 6 and 7, the electrostatic model (for example, charges Q associated with one or more of the graphical objects) may be adapted, modified and/or configured in accordance with a context for the function(s) corresponding to at least one of the graphical objects and/or in accordance with content that is provided by the user.

Figure 2A:
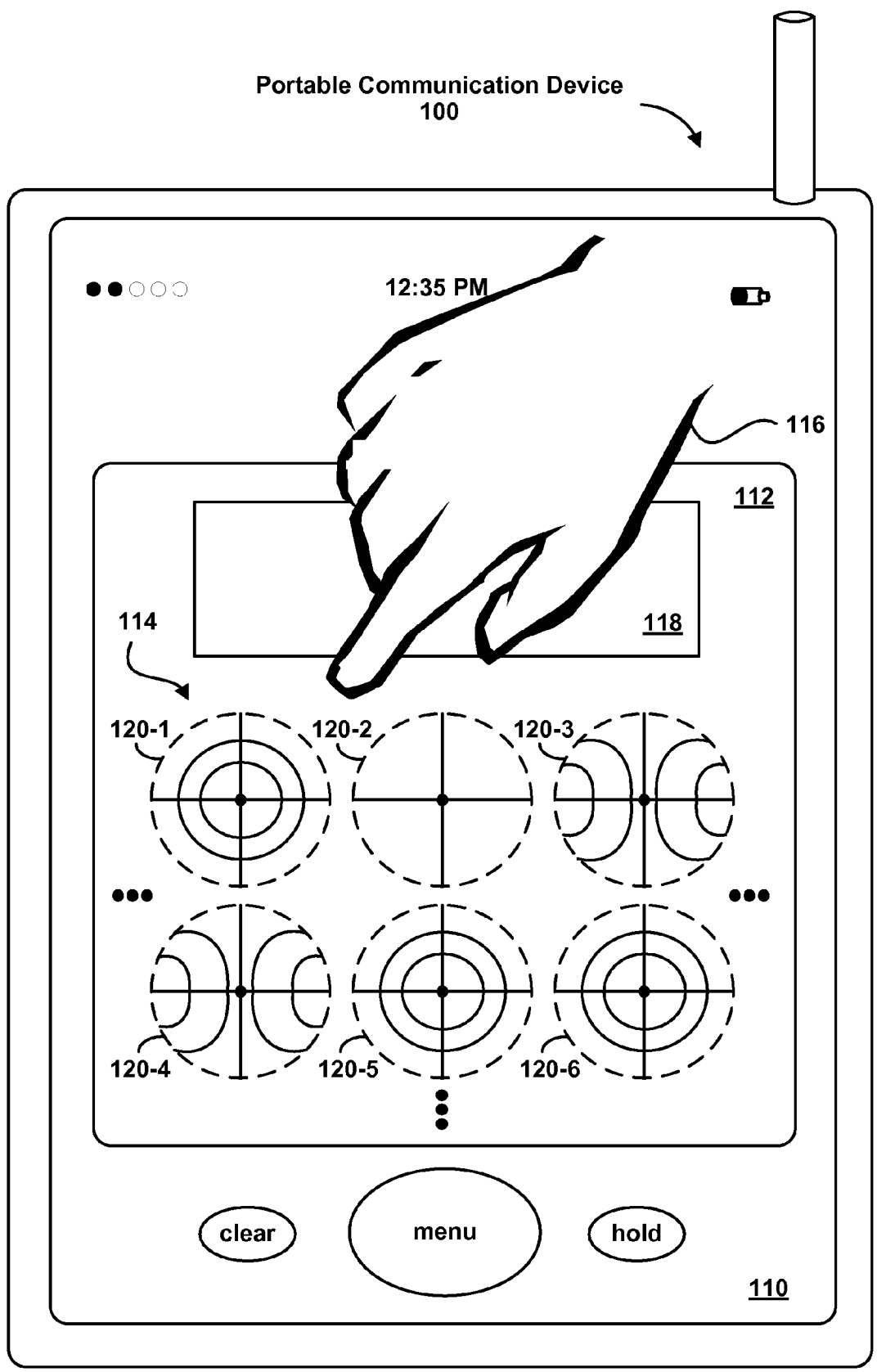
FIG. 2A is a schematic diagram illustrating an embodiment of a portable electronic device with content-dependent touch sensitivity.
Figure 2B:
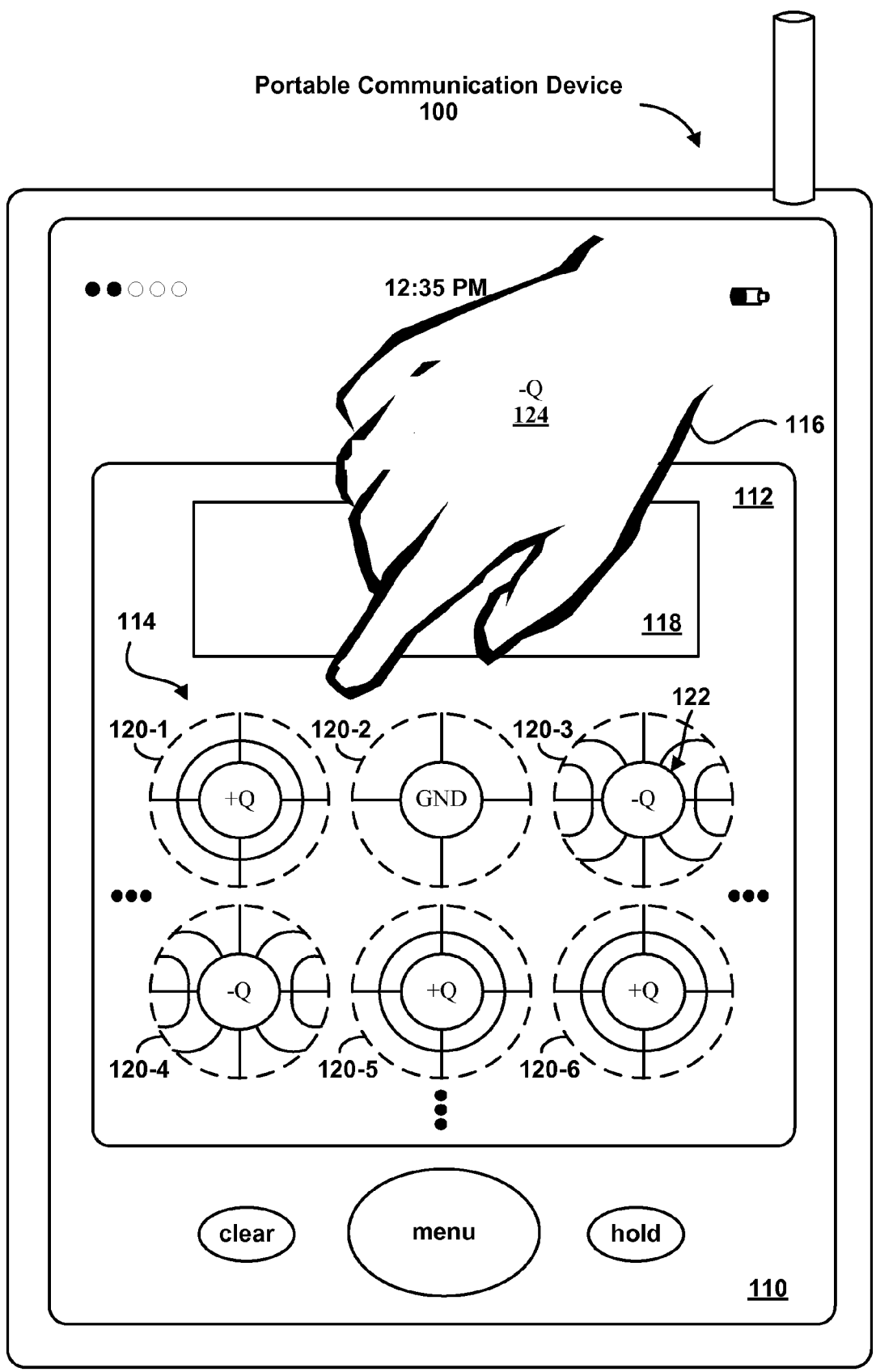
FIG. 2B is a schematic diagram illustrating an embodiment of a portable electronic device with content-dependent touch sensitivity.

FIG. 2A is a schematic diagram illustrating an embodiment of the portable electronic device 100 with content-dependent touch sensitivity. One or more graphical objects 120 in the keyboard 114 (FIG. 1) are shown. These graphical objects 120 each have an associated charge Q in the electrostatic model. As shown in FIG. 2B, the associated charges Q of the graphical objects 120 may be positive, negative and/or ground (GND). In some embodiments, the associated charges Q of the graphical objects 120 may be positive definite, i.e., between GND and a maximum positive value. In other embodiments, the associated charges Q of the graphical objects 120 may be negative definite, i.e., between a minimum negative value and GND.

In order to determine a total electrostatic field in a plane of the display surface 110, the finger 116 may be assigned an associated charge Q 124. The associated charge Q 124 may be positive or negative. In some embodiments, the associated charge Q 124 is negative and the associated charges Q of the graphical objects 120 are positive definite. In some embodiments, the associated charge Q 124 is positive and the associated charges Q of the graphical objects 120 are negative definite. As discussed further below, in some embodiments a total electrostatic potential may be used instead of the total electrostatic field. In such embodiments, the finger 116 may not be assigned the associated charge Q 124.

One or more of the associated charges Q of the graphical objects 120 may include magnitude and/or signs. As illustrated in FIG. 2A, one or more of the associated charges Q may be modeled as point charges. However, as illustrated in FIG. 2B, one or more of the associated charges Q may be modeled as a charge distributed over a respective area 122 on the display surface 110.

For a respective graphical object, such as graphical object 120-1, the corresponding associated charge Q makes a contribution to the total electrostatic field or the total electrostatic potential in the electrostatic model proportional to $Q/\Delta r^n$, where $\Delta r$ is a relative distance from the graphical object 120 in a plane of the display surface 110. The relative distance $\Delta r$ may be determined based on a known position of the displayed graphical object 120-1 (or region 122 of the displayed graphical object) and a contact position (or contact area) of the finger 116 with the display surface 110. In some embodiments, n may be between approximately 1 and approximately 2. In some embodiments, n may be between approximately 0 and approximately 1.

As illustrated in FIGS. 2A and 2B, the electrostatic field or the electrostatic potential of a respective graphical object, such as the graphical object 120-1, may be truncated on a respective boundary surface surrounding the graphical object 120-1 and in the plane of the display surface 110. In such embodiments, the associated charge Q for a respective graphical object will only contribute to the total electrostatic field or the total electrostatic potential for positions within the corresponding boundary surface. This truncation may simplify the computation of the total electrostatic field or the total electrostatic potential in the plane of the display surface 110.

The total electrostatic field or the total electrostatic potential at the contact position in the plane of the display surface 110 may be determined by linear superposition of the fields or potential corresponding to associated charges Q for the graphical objects 120. In the discussion that follows, the total electrostatic force is used an illustrative example.

Figure 3:
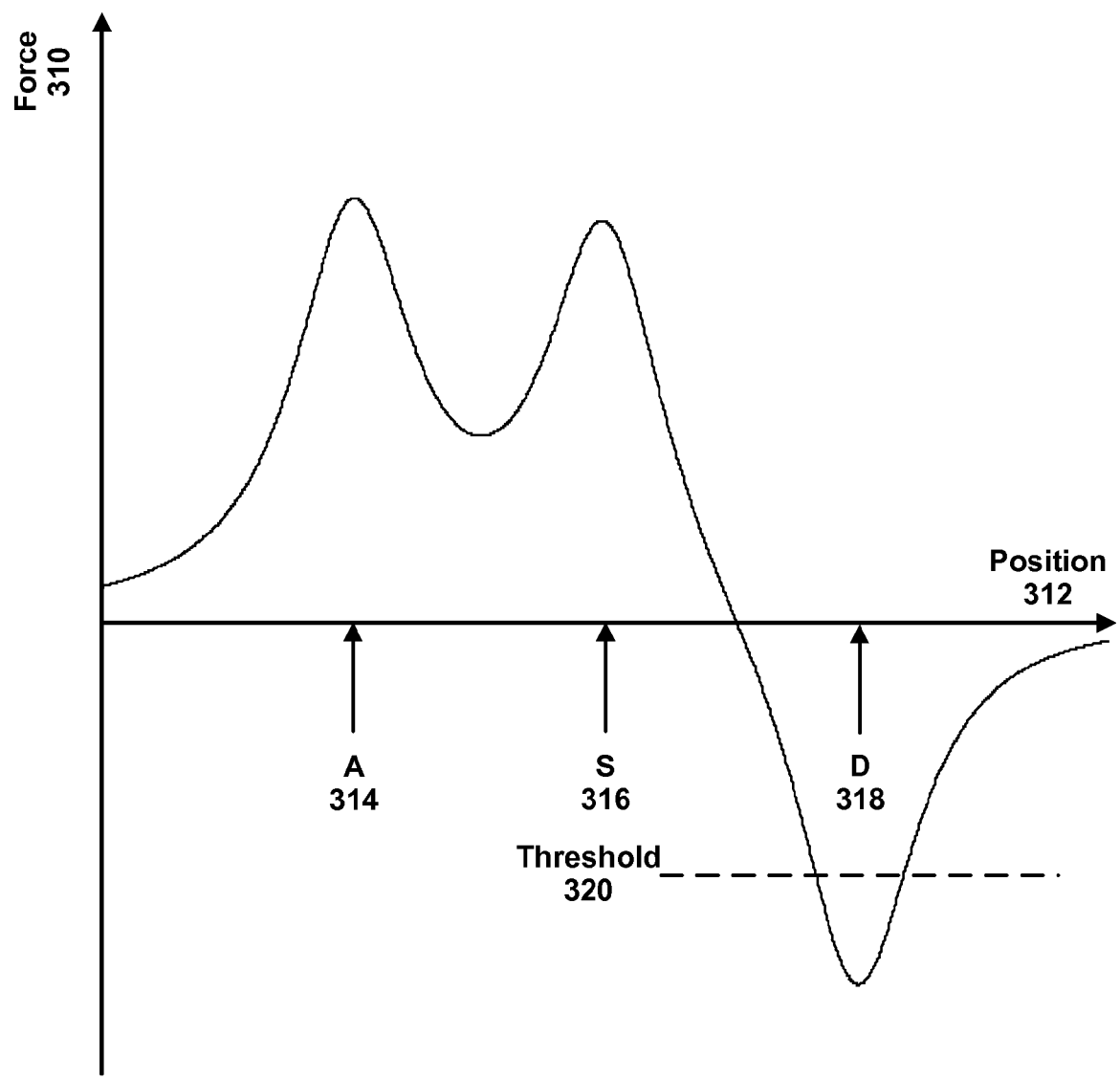
FIG. 3 is an illustration of a total electrostatic force as a function of position.

FIG. 3 is an illustration of a total electrostatic force 310 as a function of position 312. The total electrostatic force 310 in the plane of the display surface 110 (FIG. 1) varies as a function of the position 312, and includes two local maxima and a minimum corresponding to graphical objects for a letter A 314, a letter S 316 and a letter D 318. A magnitude of the total electrostatic force 310 may be used, at least in part, to determine if the function corresponding to a respective graphical object has been activated by the user, for example, if the contact point for the finger 116 (FIG. 1) corresponds to a position of the graphical icon for the letter D 318, and a magnitude of the total electrostatic force 310 is large enough. For example, the magnitude may exceed a threshold 320. In some embodiments, a direction or sign of the total electrostatic force 310 may be used, at least in part, to determine if the function corresponding to a respective graphical object has been activated by the user. The magnitude and/or direction of the total electrostatic force 310 may be used in conjunction with a user making and/or breaking contact with the display surface 110 (FIG. 1) in order to determine if the function corresponding to a respective graphical object has been activated by the user.

Figure 4:
FIG. 4 is an illustration of an embodiment of a contact region.

As discussed previously, the determination of the total electrostatic force or the total electrostatic potential may be performed using a point charge model or a distributed charge model. In the latter, a fraction of the associated charge for a respective graphical object may be associated with one or more regions or areas on the display surface 110 (FIG. 1) and the total electrostatic force or the total electrostatic potential may be determined by summation over a plurality of such regions. The plurality of the regions may correspond to the respective area 122 (FIG. 2B) of a respective graphical object and/or a contact area between the display surface 110 (FIG. 1) and the finger 116 (FIG. 1). FIG. 4 is an illustration of an embodiment of a contact region 410. The portable electronic device 100 (FIG. 1) may obtain an 8-bit image of the contact region 410 allowing the contact position or area to be determined. This may be useful, especially since a shape of the contact region 410 may change depending on which finger(s) the user is using and how the user is holding the portable electronic device 100 (FIG. 1) while using it.

Figure 5:
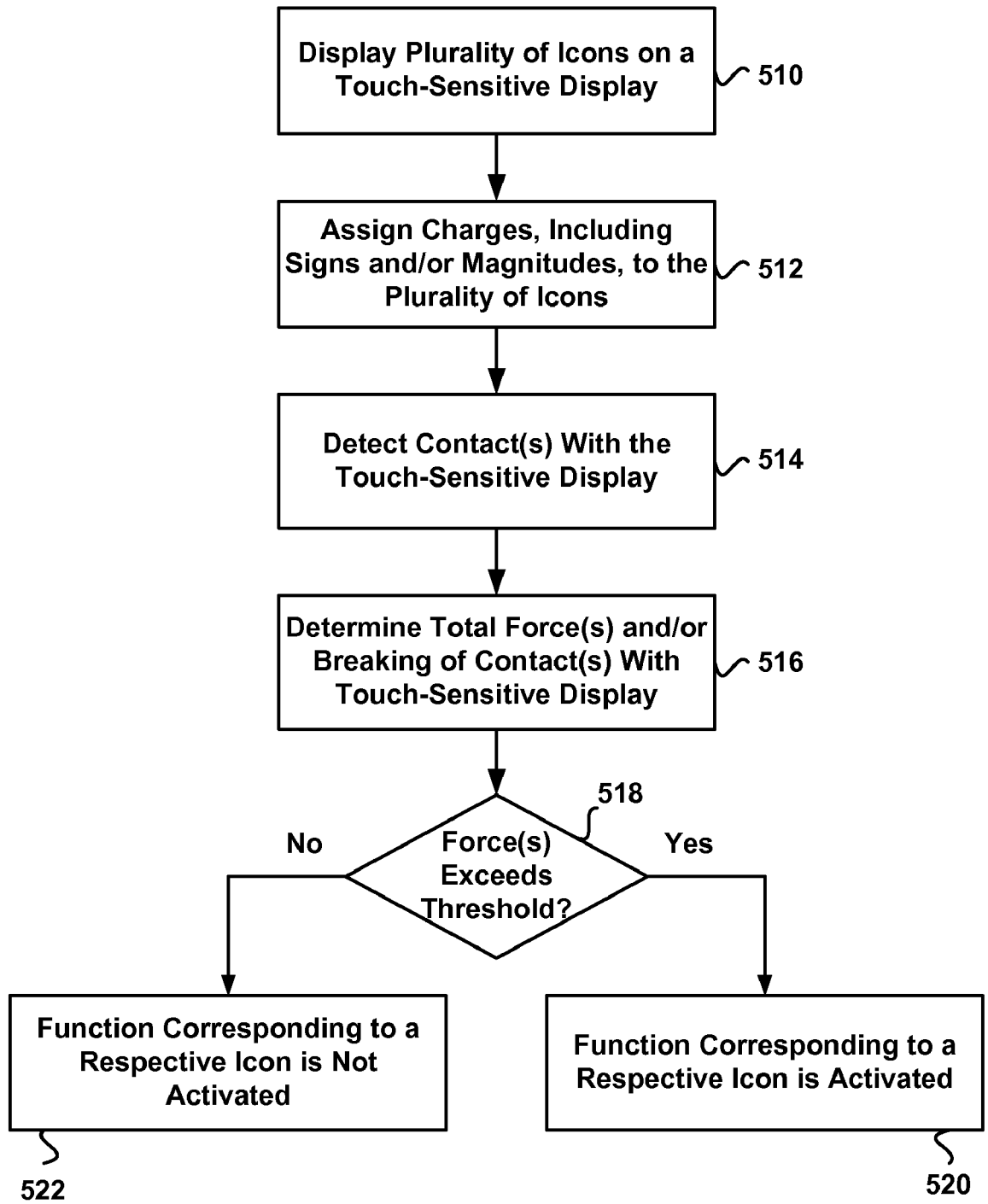
FIG. 5 is a flow diagram of an embodiment of a contact detection process.

Attention is now directed towards embodiments of methods or processes of content-dependent touch sensitivity. FIG. 5 is a flow diagram of an embodiment of a contact detection process 500. While the contact detection process 500 described below includes a number of operations that appear to occur in a specific order, it should be apparent that the process 500 can include more or fewer operations, which can be executed serially or in parallel (e.g., using parallel processors or a multi-threading environment), an order of two or more operations may be changed and/or two or more operations may be combined into a single operation.

A plurality of icons or graphical objects are displayed on a touch-sensitive display (510). Charges, including signs and/or magnitudes, are assigned to the plurality of icons or graphical objects (512). One or more contact(s) with the touch-sensitive display are detected (514). One or more total force (s) (each associated, for example, with one or more of the icons or graphical objects) and/or breaking of one or more contacts with the touch-sensitive display are determined (516). If magnitudes and/or directions of one or more of the total forces exceeds a threshold (518-yes), a function corresponding to at least a respective graphical object or icon is activated (520). If magnitudes and/or directions of one or more of the total forces does not exceed a threshold (518-no), a function corresponding to at least a respective graphical object or icon is not activated (522).

As discussed previously, the electrostatic model in the portable electronic device 100 (FIG. 1) may be adjusted, adapted, configurable and/or configured. This capability may improve ease of use of the portable electronic device 100 (FIG. 1). For example, it may make it easier for the user to activate one or more functions corresponding to one or more graphical objects.

In some embodiments, a respective contact area and/or the respective charge for the respective graphical object is determined in accordance with a context for the function corresponding to the respective icon, such as a risk assessment. For example, if there is a high risk associated with the activation of a respective graphical object (such as a loss of data associated with a delete or application termination icon), the parameters in the electrostatic model for this graphical object may be selected such that it is difficult for the user to accidentally activate this graphical object.

In some embodiments, the determining may be in accordance with a data structure and/or a state machine (corresponding to a Markov sequence or process) that corresponds to a language. For example, the data structure or state machine may be based on a stochastic model of the relationships among letters in the language. Analysis of a dictionary for a language may show that certain letters are more common (such as a, e, h, i, n, o, r, s and t) than others. Graphical objects corresponding to such letters may have associated charges Q and/or contact areas that make them easier for a user to activate. Alternatively, the associated charges Q and/or contact areas for at least a subset of the graphical objects in the keyboard 114 (FIG. 1) may be dynamically adjusted, adapted and/or configured based on a letter history in conjunction with a probabilistic model for the likelihood of a subsequent letter occurring (i.e., a relative frequency of occurrence of groups of letters) given a set of letters or characters that have already been selected by the user.

A path memory (such as 3 or 4 letters) of the probabilistic model represents a tradeoff between accuracy and the processing and power capabilities (for example, battery life) of the portable electronic device 100 (FIG. 1). In an exemplary embodiment, the probabilistic model may include groups of 4 letters, where the first 3 letters are used to estimate a probability of a given fourth letter. Associated charges for the corresponding graphical objects in the keyboard 114 (FIG. 1) may be selected based on the probabilities. For example, if there are several possible letters given 3 letters that have been entered by the user, these letters may be assigned associated charges Q. A respective associated charge Q for each of these letters may be in accordance with a corresponding probability in the probabilistic model. Thus, higher probability letters may have corresponding larger-magnitude associated charges Q. In addition, graphical objects corresponding to unlikely letters may have lower-magnitude assigned charges Q or even charges having the opposite sign to make it difficult for the user to accidentally select such graphical objects.

In some embodiments, such a probabilistic model may be based on a lexicography and usage that is user-specific. For example, user emails, address book and/or other documents may be analyzed to determine an appropriate probabilistic model for that user based on the syntax and/or lexicography (including names and slang) that are employed by the user. The probabilistic model may be updated continuously, after pre-determined time intervals, or when a new word or syntax is employed by the user.

In some embodiments, the probabilistic model may be based on one or more mistakes made by the user when using the keyboard 114 (FIG. 1). For example, if the user accidentally selects the wrong graphical object when typing a respective word, the associated charges Q and/or contact areas of at least some of the graphical objects in the keyboard 114 (FIG. 1) may be selected to reduce a likelihood of such an error in the future when the user is typing the respective word. In an exemplary embodiment, a mistake may be determined based on a user activation of a graphical object corresponding to the delete function. This adaptability of the portable electronic device 100 (FIG. 1) may allow correction of user interface errors (such as parallax and/or left-right symmetry) associated with which finger(s) the user is using and how the user is holding the portable electronic device 100 (FIG. 1) while using it.

Figure 6:
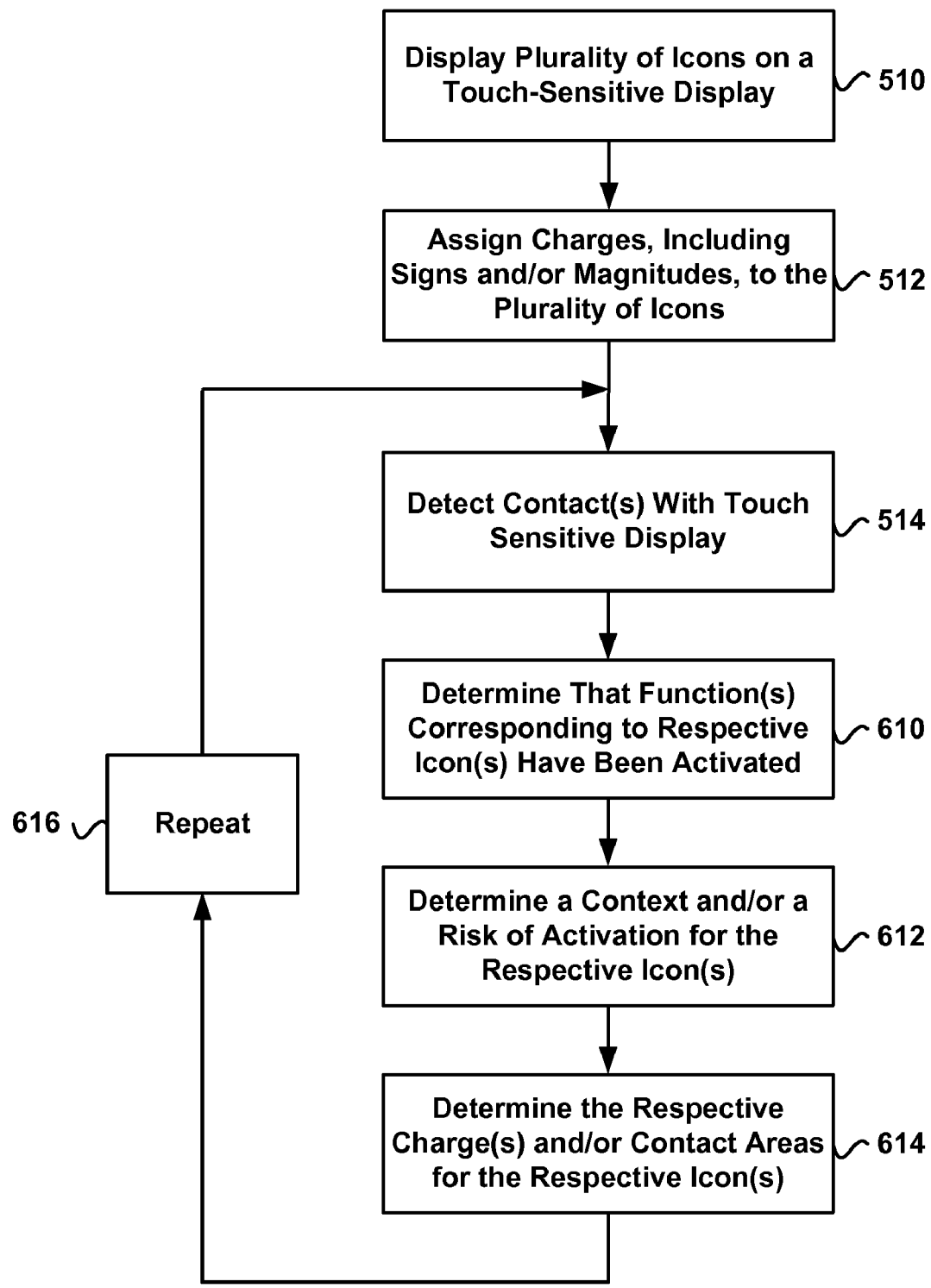
FIG. 6 is a flow diagram of an embodiment of a context adjustment process.

FIG. 6 is a flow diagram of an embodiment of a context adjustment process 600. While the context adjustment process 600 described below includes a number of operations that appear to occur in a specific order, it should be apparent that the process 600 can include more or fewer operations, which can be executed serially or in parallel (e.g., using parallel processors or a multi-threading environment), an order of two or more operations may be changed and/or two or more operations may be combined into a single operation.

The plurality of icons or graphical objects are displayed on the touch-sensitive display (510). Charges, including signs and/or magnitudes, are assigned to the plurality of icons or graphical objects (512). One or more contact(s) with the touch-sensitive display are detected (514). Activation of one or more functions corresponding to the respective icon(s) or graphical object(s) is detected (610). A context and/or a risk of activation for the respective icon(s) or graphical object(s) is determined (612). The respective charge(s) and/or contact area(s) for the respective icon(s) or graphical object(s) are determined (614) based at least in part on the context and/or the risk of activation. A portion of the process 600 may repeat (616) at the detection of one or more contact(s) with the touch-sensitive display (516).

Figure 7A:
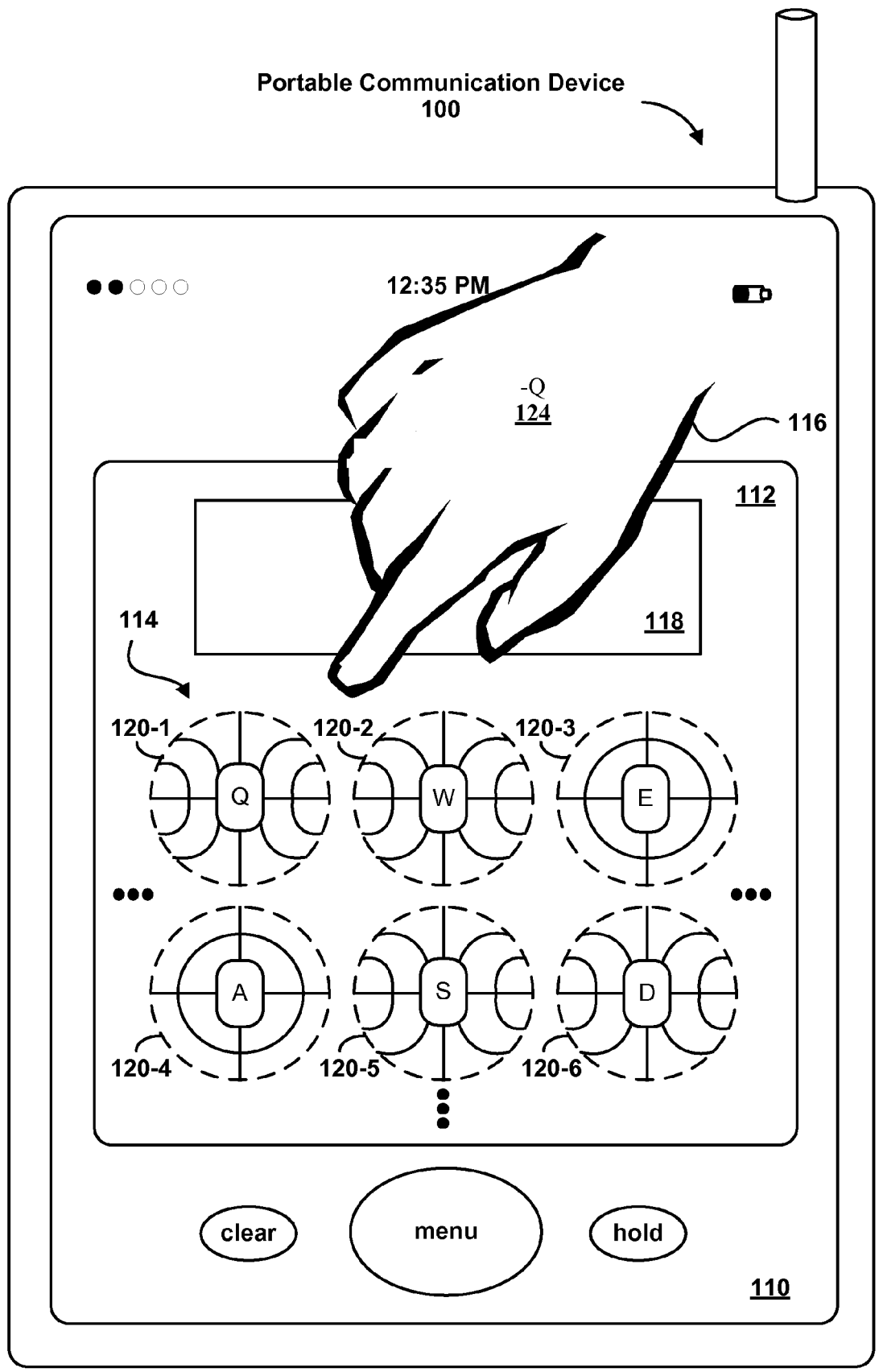
FIG. 7A is a schematic diagram illustrating an embodiment of a portable electronic device with content-dependent touch sensitivity.

FIG. 7A is a schematic diagram illustrating an embodiment of the portable electronic device 100 with content-dependent touch sensitivity. Each of the plurality of graphical objects 120 shown corresponds to a letter or character on the keyboard 114 (FIG. 1), and the plurality of graphical objects 120 have associated charges Q. As an illustration some of the plurality of graphical objects 120 are currently assigned charges Q with a negative sign (including graphical objects 120-1, 120-2, 120-5 and 120-6 corresponding to the letters Q, W, S and D) and some of the plurality of graphical objects 120 are currently assigned charges Q with a positive sign (including graphical objects 120-3 and 120-4 corresponding to the letters E and A).

Figure 7B:
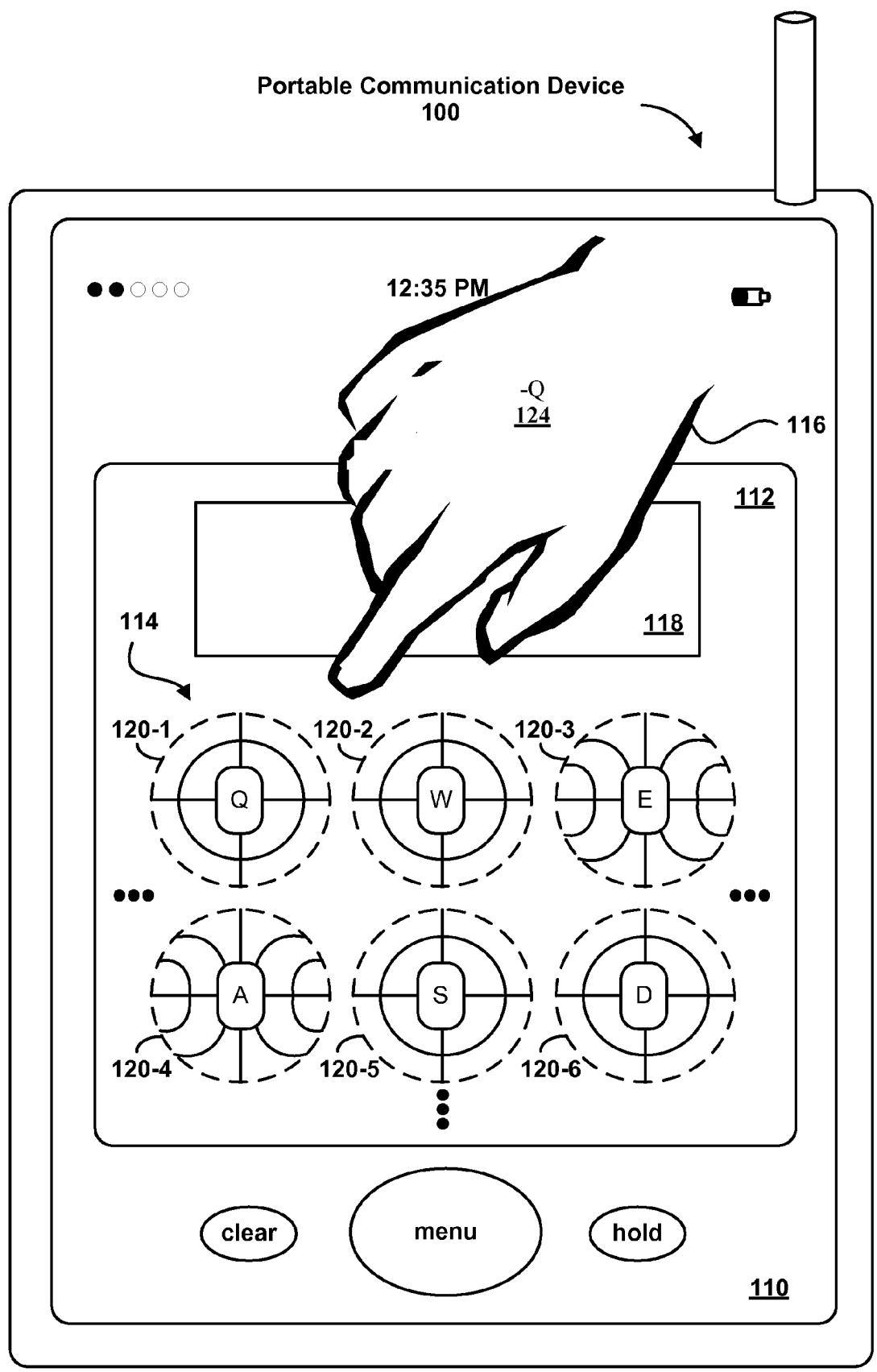
FIG. 7B is a schematic diagram illustrating an embodiment of a portable electronic device with content-dependent touch sensitivity.

Selection of a respective graphical object may result in new charges (magnitudes and/or signs) and/or contact areas being dynamically assigned to one or more of the plurality of graphical objects 120. This is illustrated in FIG. 7B, which is a schematic diagram of an embodiment of the portable electronic device 100 with content-dependent touch sensitivity.

After one or more of the graphical objects 120 have been selected, some of the plurality of graphical objects 120 are assigned charges Q with a negative sign (including graphical objects 120-3 and 120-4 corresponding to the letters E and A) and some of the plurality of graphical objects 120 are assigned charges Q with a positive sign (including graphical objects 120-1, 120-2, 120-5 and 120-6 corresponding to the letters Q, W, S and D).

Figure 8:
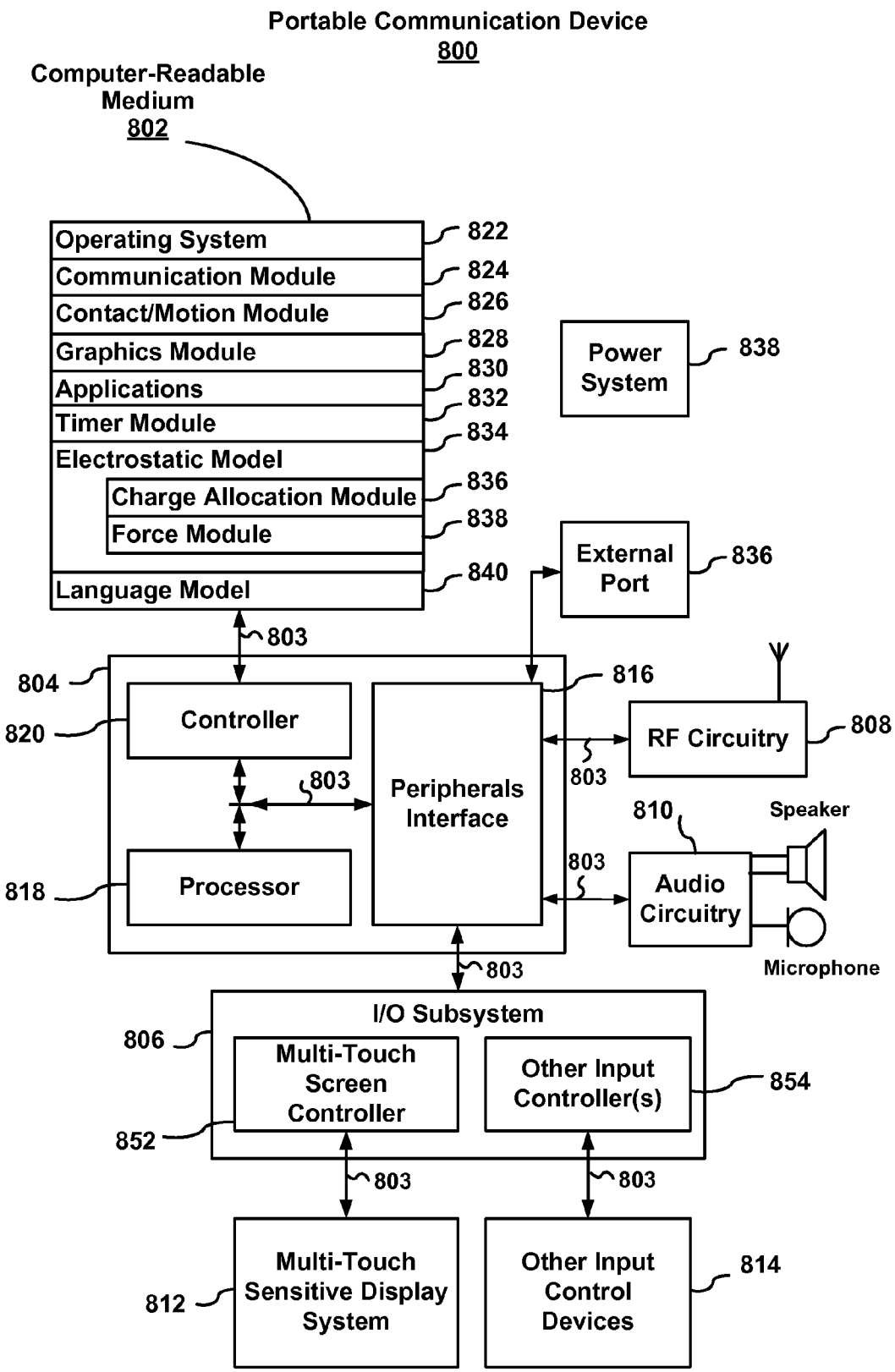
FIG. 8 is a block diagram illustrating an embodiment of an architecture for a portable electronic device.

Attention is now directed towards embodiments of the portable electronic device architecture. FIG. 8 is a block diagram of one embodiment of architecture for a portable electronic device 800. The portable electronic device 800 generally includes one or more computer-readable mediums 802, a processing system 804, an Input/Output (I/O) subsystem 806, radio frequency (RF) circuitry 808 and audio circuitry 810. These components may be coupled by one or more communication buses or signal lines 803. The device 800 may be any portable electronic device, including but not limited to a handheld computer, a tablet computer, a mobile phone, a media player, personal digital assistant (PDA) and the like, including a combination of two or more of these items.

It should be apparent that the architecture shown in FIG. 8 is only one example of an architecture for the portable electronic device 800, and that the device 800 could have more or fewer components than shown, or a different configuration of components. The various components shown in FIG. 8 may be implemented in hardware, software or a combination of both hardware and software, including one or more signal processing and/or application specific integrated circuits.

The RF circuitry 808 is used to send and receive information over a wireless link or network to one or more other devices and includes well-known circuitry for performing this function, including but not limited to an antenna system, an RF transceiver, one or more amplifiers, a tuner, one or more oscillators, a digital signal processor, a CODEC chipset, memory, etc. In some embodiments, the RF circuitry 808 is capable of establishing and maintaining communications with other devices using one or more communications protocols, including but not limited to time division multiple access (TDMA), code division multiple access (CDMA), global system for mobile communications (GSM), Enhanced Data GSM Environment (EDGE), wideband code division multiple access (W-CDMA), Wi-Fi (such as IEEE 802.11a, IEEE 802.11b, IEEE 802.11 g and/or IEEE 802.11n), Bluetooth, Wi-MAX, voice over Internet Protocol (VoIP), a protocol for email, instant messaging, and/or a short message service (SMS).), or any other suitable communication protocol, including communication protocols not yet developed as of the filing date of this document.

The RF circuitry 808 and the audio circuitry 810 are coupled to the processing system 804 via the peripherals interface 816. The interface 816 includes various known components for establishing and maintaining communication between peripherals and the processing system 804. The audio circuitry 810 is coupled to an audio speaker and a microphone and includes known circuitry for processing voice signals received from interface 816 to enable a user to communicate in real-time with other users. In some embodiments, the audio circuitry 810 includes a headphone jack (not shown). Voice and data information received by the RF circuitry 808 and the audio circuitry 810 (e.g., in speech recognition or voice command applications) is sent to one or more processors 818 via the peripherals interface 816. The one or more processors 818 are configurable to process various data formats for one or more applications programs 830 stored on the medium 802.

Note that the term "data" includes but is not limited to text, graphics, Web pages, JAVA applets, widgets, emails, instant messages, voice, digital images or video, widgets, MP3s, etc., which may be used by one or more applications programs 830 stored on the medium 802 (e.g., Web browser, email, etc.). In some embodiments, the device 800 is capable of uploading and downloading various objects from the Internet over a wireless network or an external port 836, such as files, songs, digital images, videos, emails, widgets, instant messages and the like.

The peripherals interface 816 couples the input and output peripherals of the device to the processor 818 and the computer-readable medium 802. The one or more processors 818 communicate with the one or more computer-readable mediums 802 via a controller 820. The computer-readable medium 802 may be any device or medium that can store code and/or data for use by the one or more processors 818. The medium 802 may include a memory hierarchy, including but not limited to cache, main memory and secondary memory. The memory hierarchy may be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). The medium 802 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

The one or more processors 818 run various software components stored in the medium 802 to perform various functions for the device 800. In some embodiments, the software components include an operating system 822, a communication module (or set of instructions) 824, a contact/motion module (or set of instructions) 826, a graphics module (or set of instructions) 828, one or more applications (or set of instructions) 830, a timer module (or set of instructions) 832 and an electrostatic model (or set of instructions) 834 and/or a language model (or a set of instructions) 840.

The operating system 822 (e.g., Darwin, RTXC, LINUX, UNIX, OS X, WINDOWS, or an embedded operating system such as VxWorks) includes various procedures, sets of instructions, software components and/or drivers for controlling and managing general system tasks (e.g., memory management, storage device control, power management, etc.) and facilitates communication between various hardware and software components.

The communication module 824 facilitates communication with other devices over one or more external ports 836 and includes various software components for handling data received by the RF circuitry 808 and/or the external port 836. The external port 836 (e.g., USB, FireWire™, etc.) is adapted for coupling directly to other devices or indirectly over a network (e.g., the Internet, wireless LAN, etc.).

The graphics module 828 includes various known software components for rendering, animating and displaying graphical objects on a display surface of a multi-touch-sensitive display system 812. Note that the term "graphical object" includes any object that may be displayed to a user, including without limitation text, web pages, icons, digital images, animations and the like.

The one or more applications 830 may include any applications installed on the device 800, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player (which plays back recorded music stored in one or more files, such as MP3 or AAC files), etc.

In some embodiments, the device 800 may include the functionality of an MP3 player, such as an iPod (trademark of Apple Computer, Inc.). The device 800 may, therefore, include a 36-pin connector that is compatible with the iPod. In some embodiments, the device 800 may include one or more optional optical sensors (not shown), such as CMOS or CCD image sensors, for use in imaging applications.

The contact/motion module 826 includes various software components for performing various tasks associated with the multi-touch-sensitive display system 812. The timer module 832 is a software timer that may be used to provide clock (such as time out signals) for one or more of the applications 830. The timer module 832 may also be implemented in hardware.

The electrostatic model 834 may include a charge allocation module (or a set of instructions) 836 and/or a force module 838. The charge allocation module 836 may determine, select or assign charges for one or more graphical objects displayed on the display system 812. The force module 838 may determine a total force (or a total potential) at a contact point or area on the display system 812. In some embodiments, the charges from the charge model 836 may be based, at least in part, on the language model 840. The contact/motion module 826 may determine if contact with the display system 812 corresponds to one or more graphical objects displayed on the display system 812 based, at least in part, on the electrostatic model 834.

The I/O subsystem 806 is coupled to the multi-touch-sensitive display system 812 and one or more other physical control devices 814 (e.g., pushbuttons, switches, dials, LEDs, etc.) for controlling or performing various functions, such as power control, speaker volume control, ring tone loudness, keyboard input, scrolling, hold, menu, screen lock, clearing and ending communications and the like. The multi-touch-sensitive display 812 communicates with the processing system 804 via the multi-touch sensitive screen controller 852 which includes various components for processing user input (e.g., scanning hardware). The one or more other input controllers 854 receives/sends electrical signals from/to the other input or control devices 814. The other input/control devices 814 may include physical buttons (e.g., push buttons, rocker buttons, etc.), dials, slider switches, sticks, and so forth.

The multi touch-sensitive display 812 displays visual output to the user. The visual output may include text, graphics, video, and any combination thereof. Some or all of the visual output may correspond to user-interface objects. The multi touch-sensitive display 812 may also accept input from the user based on haptic and/or tactile contact. The multi touch-sensitive display 812 forms a touch-sensitive surface that accepts user input. The multi touch-sensitive display 812 and the multi-touch screen controller 852 (along with any associated modules and/or sets of instructions in the medium 802) detects contact (and any movement or release of the contact) on the multi touch-sensitive display 812 and converts the detected contact into interaction with user-interface objects or icons, such as one or more soft keys, that are displayed on the touch screen when the contact occurred. In an exemplary embodiment, a position of contact between the multi touch-sensitive display 812 and the user corresponds to one or more digits of the user. The multi touch-sensitive display 812 may use LCD (liquid crystal display) technology, or LPD (light emitting polymer display) technology, although other display technologies may be used in other embodiments. The multi touch-sensitive display 812 and multi-touch screen controller 852 may detect contact and any movement or release thereof using any of a plurality of touch sensitivity technologies, including but not limited to capacitive, resistive, infrared, and surface acoustic wave technologies, as well as other proximity sensor arrays or other elements for determining one or more positions of contact with the multi touch-sensitive display 812.

The touch-sensitive display may be analogous to the multi-touch sensitive tablets described in the following U.S. Pat. No.: 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference. However, the touch screen 812 displays visual output from the portable device, whereas touch sensitive tablets do not provide visual output. The multi touch-sensitive display 812 may have a resolution in excess of 100 dpi. In an exemplary embodiment, the touch-sensitive display 812 may have a resolution of approximately 168 dpi. The user may make contact with the multi touch-sensitive display 812 using any suitable object or appendage, such as a stylus, pen, finger, and so forth.

In some embodiments, in addition to the touch screen, the device 800 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the multi touch-sensitive display 812 or an extension of the touch-sensitive surface formed by the multi touch-sensitive display 812.

The device 800 also includes a power system 838 for powering the various hardware components. The power system 838 may include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in portable devices.

In some embodiments, the peripherals interface 816, the one or more processors 818, and the memory controller 820 may be implemented on a single chip, such as the processing system 804. In some other embodiments, they may be implemented on separate chips.

Figure 9:
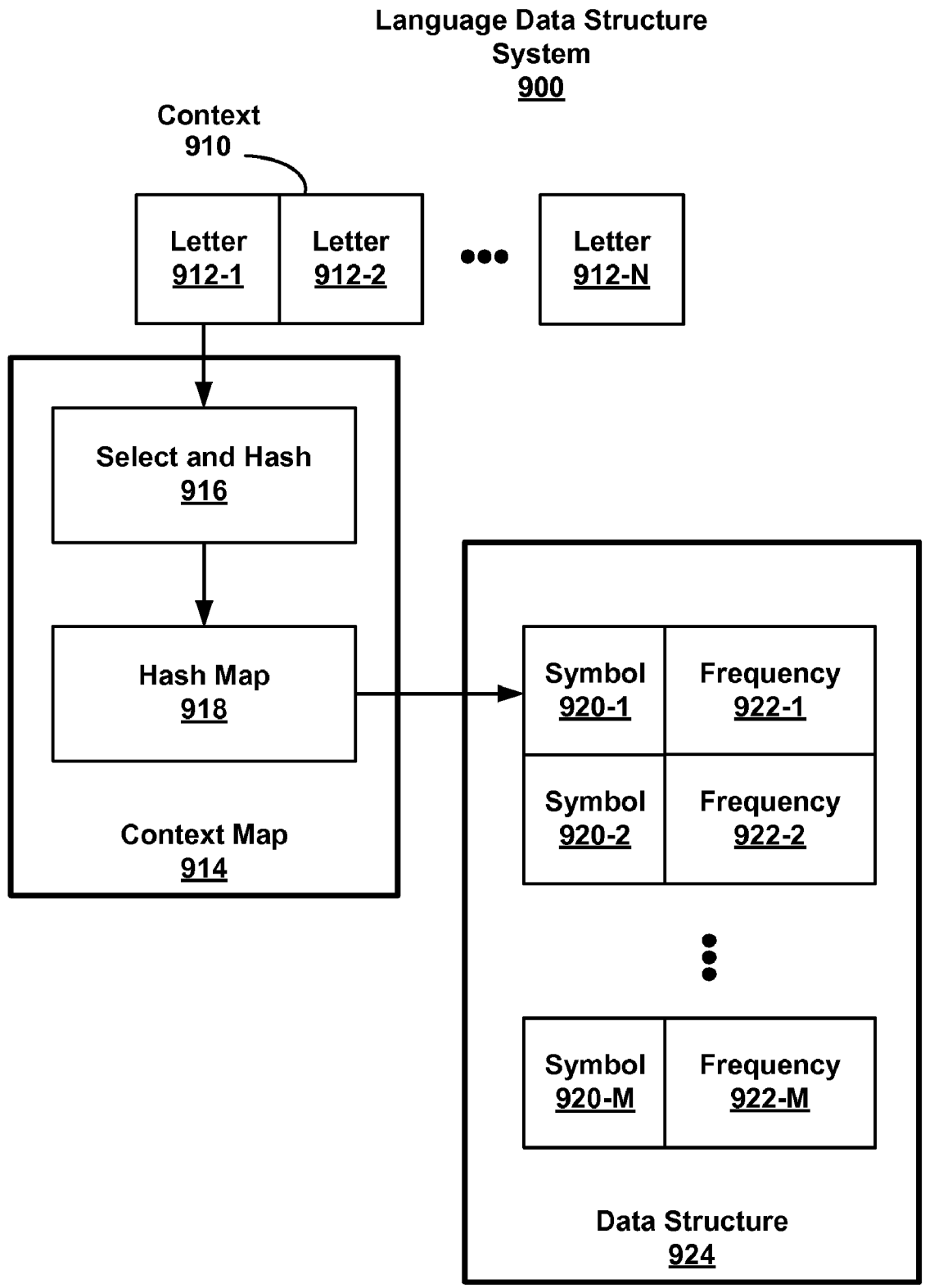
FIG. 9 is a block diagram illustrating an embodiment of a language data structure system.

Attention is now directed towards embodiments of data structure systems that may be used in implementing context dependent touch sensitivity. FIG. 9 is a block diagram illustrating an embodiment of a data structure system 900. A group of characters and/or letters 912 in a context 910 are processed by a context map 914. The context map 914 includes a select and hashing module 916 and a hash map 918. The hash map 918 selects one or more appropriate entries in a data structure 924. The entries in the data structure 924 include symbols 920 (such as characters and/or letters) and corresponding frequencies 922. The frequencies 922 indicate a probability of occurrence of one or more of the symbols 920 given the context 910. The associated charges Q and/or the contact areas of one or more of the graphical objects 120 (FIGS. 2A and 2B) may be determined, selected and/or adjusted in accordance with one or more of the frequencies 922. In some embodiments the data structure system 900 may include fewer or more components. Two or more components may be combined and an order of two or more components may be changed.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
    at a portable electronic device with a touch-sensitive display:
        displaying a plurality of icons on the touch-sensitive display, wherein a respective icon in the plurality of icons is assigned a respective charge, including a respective magnitude, in an electrostatic model in software;

detecting a contact region when a user makes contact with the touch-sensitive display;

determining that the contact region corresponds to one of the plurality of icons in accordance with the software-based electrostatic model; and activating a function corresponding to the one of the plurality of icons.

2. The method of claim 1, wherein the respective charge in the software-based electrostatic model gives rise to a field having a field magnitude proportional to $Q/\Delta r^n$, wherein $\Delta r$ is a relative distance from the respective icon in a plane of the touch-sensitive display, wherein Q corresponds to the respective charge and wherein n is between approximately 1 and approximately 2.

3. The method of claim 2, wherein the field in the software-based electrostatic model is truncated at a respective boundary surface corresponding to the respective icon.

4. The method of claim 1, further comprising determining, in the software-based electrostatic model, a total field at a contact position by linear superposition of fields corresponding to respective charges for one or more of the plurality of icons.

5. The method of claim 4, further comprising determining, in the software-based electrostatic model, whether a function corresponding to the respective icon is activated, at least in part, in accordance with when a user makes and breaks contact with the touch-sensitive display.

6. The method of claim 4, further comprising determining, in the software-based electrostatic model, whether a function corresponding to the respective icon is activated, at least in part, in accordance with a direction of the total field.

7. The method of claim 1, wherein the respective charge in the software-based electrostatic model for the respective icon is determined in accordance with a context for the function corresponding to the respective icon.

8. The method of claim 7, wherein the determining is in accordance with a data structure, and wherein the data structure is based on a stochastic model of relationships among letters in a language, and wherein the stochastic model includes relative frequencies of occurrence of groups of letters.

9. A portable electronic device, comprising:
a touch-sensitive display;
one or more processors;
memory; and
one or more programs, wherein the one or more programs are stored in the memory and configured to be executed by the one or more processors, the one or more programs including:
instructions for displaying a plurality of icons on the touch-sensitive display, wherein a respective icon in the plurality of icons is assigned a respective charge, including a respective magnitude, in an electrostatic model in software;
instructions for detecting a contact region when a user makes contact with the touch-sensitive display;
instructions for determining that the contact region corresponds to one of the plurality of icons in accordance with the software-based electrostatic model; and
instructions for activating a function corresponding to the one of the plurality of icons.

10. A non-transitory computer readable storage medium storing one or more programs, the one or more programs comprising instructions, which when executed by a portable electronic device with a touch-sensitive display, cause the device to:

display a plurality of icons on the touch-sensitive display means, wherein a respective icon in the plurality of icons is assigned a respective charge, including a respective magnitude, in an electrostatic model in software;

detect a contact region when a user makes contact with the touch-sensitive display means;

determine that the contact region corresponds to one of the plurality of icons in accordance with the software-based electrostatic model; and activate a function corresponding to the one of the plurality of icons.

11. The portable electronic device of claim 9, wherein the respective charge in the software-based electrostatic model gives rise to a field having a field magnitude proportional to $Q/\Delta r^n$, wherein $\Delta r$ is a relative distance from the respective icon in a plane of the touch-sensitive display, wherein Q corresponds to the respective charge and wherein n is between approximately 1 and approximately 2.

12. The portable electronic device of claim 11, wherein the field in the software-based electrostatic model is truncated at a respective boundary surface corresponding to the respective icon.

13. The portable electronic device of claim 9, wherein the one or more programs further include instructions for determining, in the software-based electrostatic model, a total field at a contact position by linear superposition of fields corresponding to respective charges for one or more of the plurality of icons.

14. The portable electronic device of claim 13, wherein the one or more programs further include instructions for determining, in the software-based electrostatic model, whether a function corresponding to the respective icon is activated, at least in part, in accordance with when a user makes and breaks contact with the touch-sensitive display.

15. The portable electronic device of claim 13, wherein the one or more programs further include instructions for determining, in the software-based electrostatic model, whether a function corresponding to the respective icon is activated, at least in part, in accordance with a direction of the total field.

16. The portable electronic device of claim 9, wherein the respective charge in the software-based electrostatic model for the respective icon is determined in accordance with a context for the function corresponding to the respective icon.

17. The portable electronic device of claim 16, wherein the determining is in accordance with a data structure, and wherein the data structure is based on a stochastic model of relationships among letters in a language, and wherein the stochastic model includes relative frequencies of occurrence of groups of letters.

18. The non-transitory computer readable storage medium of claim 10, wherein the respective charge in the software-based electrostatic model gives rise to a field having a field magnitude proportional to $Q/\Delta r^n$, wherein $\Delta r$ is a relative distance from the respective icon in a plane of the touch-sensitive display, wherein Q corresponds to the respective charge and wherein n is between approximately 1 and approximately 2.

19. The non-transitory computer readable storage medium of claim 18, wherein the field in the software-based electrostatic model is truncated at a respective boundary surface corresponding to the respective icon.

20. The non-transitory computer readable storage medium of claim 10, wherein the or more programs further comprise instructions which when executed by the portable electronic device, cause the device to determine, in the software-based electrostatic model, a total field at a contact position by linear superposition of fields corresponding to respective charges for one or more of the plurality of icons.

21. The non-transitory computer readable storage medium of claim 20, wherein the or more programs further comprise instructions which when executed by the portable electronic device, cause the device to determine, in the software-based electrostatic model, whether a function corresponding to the respective icon is activated, at least in part, in accordance with when a user makes and breaks contact with the touch-sensitive display.

22. The non-transitory computer readable storage medium of claim 20, wherein the or more programs further comprise instructions which when executed by the portable electronic device, cause the device to determine, in the software-based electrostatic model, whether a function corresponding to the respective icon is activated, at least in part, in accordance with a direction of the total field.

23. The non-transitory computer readable storage medium of claim 10, wherein the respective charge in the software-based electrostatic model for the respective icon is determined in accordance with a context for the function corresponding to the respective icon.

24. The non-transitory computer readable storage medium of claim 23, wherein the determining is in accordance with a data structure, and wherein the data structure is based on a stochastic model of relationships among letters in a language, and wherein the stochastic model includes relative frequencies of occurrence of groups of letters.

* * * * *

UNITED STATES PATENT AND TRADEMARK OFFICE
CERTIFICATE OF CORRECTION

PATENT NO.        : 7,956,846 B2                                         Page 1 of 1
APPLICATION NO.   : 11/620027
DATED             : June 7, 2011
INVENTOR(S)       : Bas Ording et al.

It is certified that error appears in the above-identified patent and that said Letters Patent is hereby corrected as shown below:

In column 13, line 10, in Claim 2, delete "$Q/\Delta^n$," and insert -- $Q/\Delta r^n$, --, therefor.

In column 14, line 64, in Claim 20, delete "or" and insert -- one or --, therefor.

In column 15, line 4, in Claim 21, delete "or" and insert -- one or --, therefor.

In column 15, line 13, in Claim 22, delete "or" and insert -- one or --, therefor.

Signed and Sealed this
Third Day of July, 2012

David J. Kappos
*Director of the United States Patent and Trademark Office*